United States Patent [19]
Kameyama

[11] Patent Number: 5,279,507
[45] Date of Patent: Jan. 18, 1994

[54] CONNECTOR FOR USE IN VEHICLES

[75] Inventor: Isao Kameyama, Shizuoka, Japan

[73] Assignee: Yazaki Corporation, Japan

[21] Appl. No.: 946,980

[22] Filed: Sep. 17, 1992

[30] Foreign Application Priority Data

Sep. 26, 1991 [JP] Japan .................. 3-77982[U]
Dec. 6, 1991 [JP] Japan .................. 3-100749[U]

[51] Int. Cl.$^5$ .................................. H01R 13/74
[52] U.S. Cl. ........................ 439/552; 439/270; 439/271
[58] Field of Search ............ 439/271, 272, 544, 552, 439/557, 567

[56] References Cited

U.S. PATENT DOCUMENTS

| | | | |
|---|---|---|---|
| 3,753,212 | 8/1973 | Yamada et al. | 439/557 X |
| 4,711,507 | 12/1987 | Noorily | 439/557 X |
| 4,946,404 | 8/1990 | Takenouchi et al. | |
| 4,950,179 | 8/1990 | Takenouchi et al. | |

FOREIGN PATENT DOCUMENTS

60-117622  8/1985  Japan .
1-165582  11/1989  Japan .
2-10765   3/1990  Japan .

Primary Examiner—Eugene F. Desmond
Attorney, Agent, or Firm—Krass & Young

[57] ABSTRACT

The connector includes a body, a resilient locking arm provided on the body and with a locking projection at its free end which engages in a connection hole in a panel to lock the connector to the panel, and a lock-up detector. The lock-up detector is provided in a preliminarily engaged state between the locking arm and the body prior to the fitting of the connector to the panel with a length thereof protruded more than the locking projection. When the connector is completely locked to the panel, the lock-up detector is released from the preliminarily engaged state and becomes insertable by a push from the opposite side of the panel to the connector. This enables confirmation of whether a connector attached to the end of a wire harness is completely fitted to a panel, e.g., at a door portion of an automobile from outside the panel and improves the reliability of a connector as a product.

3 Claims, 11 Drawing Sheets

CONNECTOR FOR USE IN VEHICLES

BACKGROUND OF THE INVENTION

1. Field of the Invention

The present invention relates to connectors for use in vehicles for interconnecting wire harnesses disposed at door portions, etc. of an automobile and the like.

2. Description of the Prior Art

Figure 9:
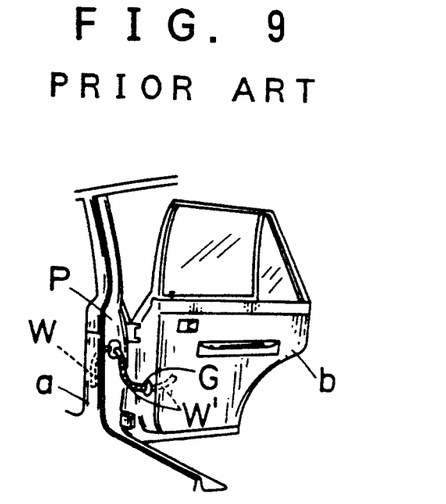
FIG. 9 is a perspective view showing wire harnesses on the door and the body sides connected in a conventional manner.
Figure 10:
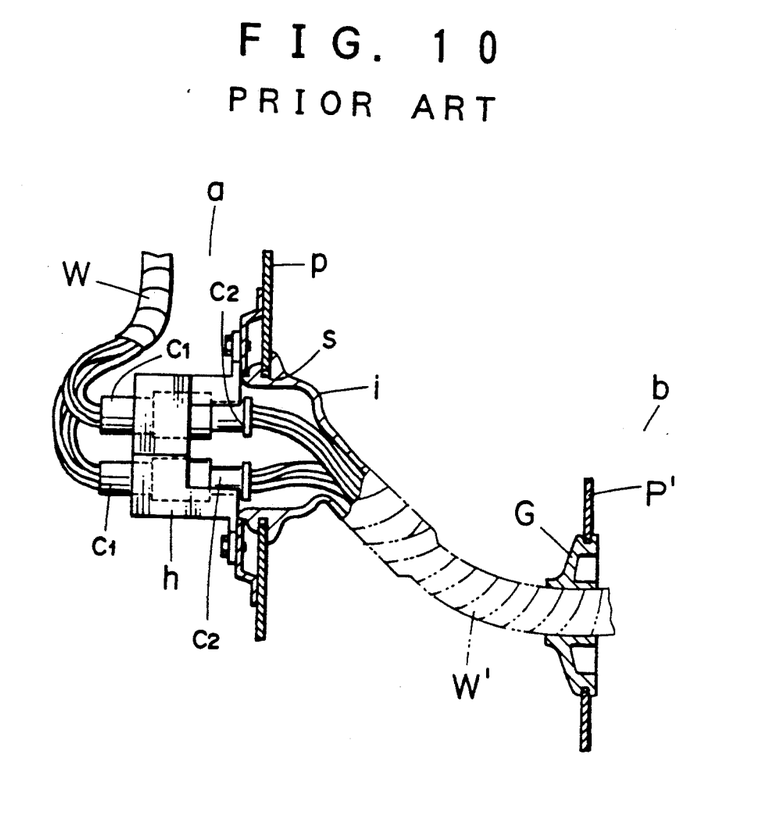
FIG. 10 is a sectional view showing the wire harnesses connected in the conventional manner.

FIGS. 9 and 10 show a conventional structure for interconnecting wire harnesses at automotive door portions by using connectors.

More specifically, at the area where a door b is hingedly fitted to a vehicle body a, connectors c1 are attached to the end of a wire harness W on the side of the vehicle body a and fitted in and supported by a connector holder h fixed to a vehicle body side panel P. Extended from inside the door b through a grommetted hole G formed in a door panel P' is a wire harness W' to the end of which are attached connectors c2. The connectors c2 are introduced inside the panel P through a connection hole s formed in the panel P and a grommet i covering the hole so as to be coupled to the connectors c1.

With the above conventional structure, however, it is difficult to confirm from outside, at the time of coupling the connectors c1 and c2, whether or not the connectors c1 are completely fixed to the panel P. In addition, the coupling between the connectors c1 and c2 is apt to get loosened under external forces such as vibrations, lowering the reliability of the product.

Figure 15:
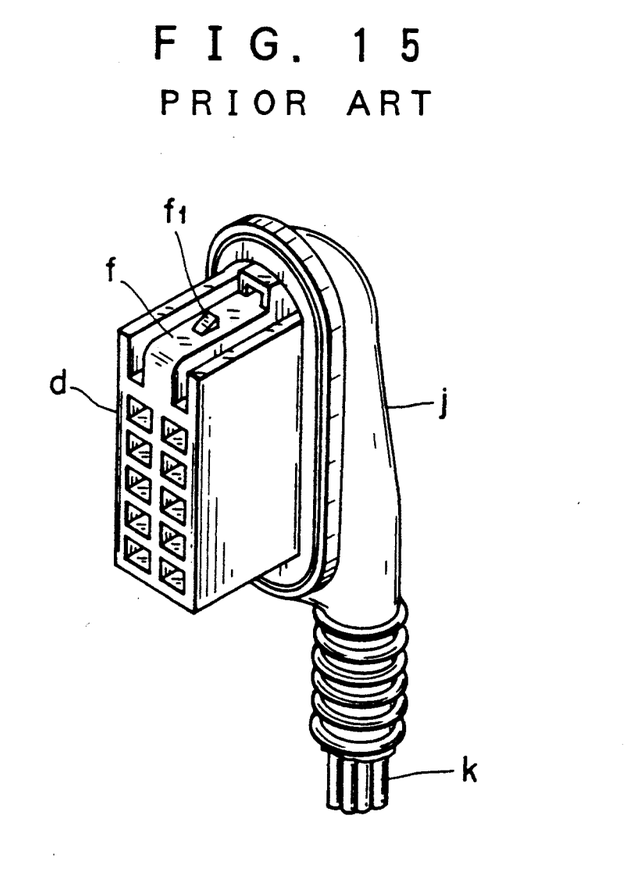
FIG. 15 is a perspective view of a conventional grommetted connector for a wire harness on the door side.
Figure 16:
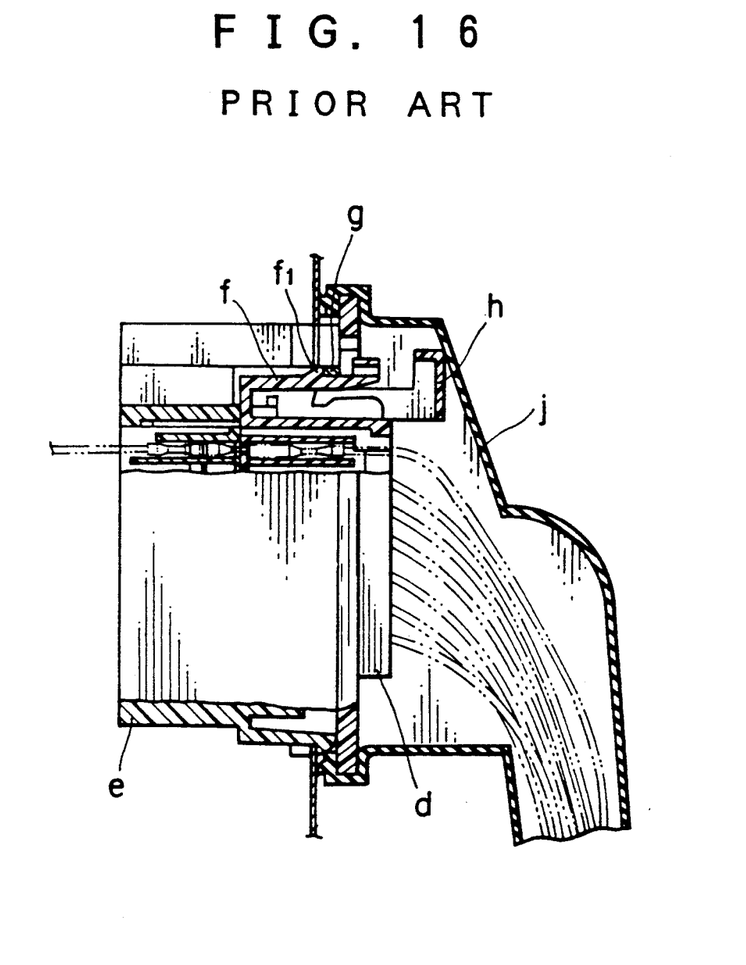
FIG. 16 is a sectional view showing the conventional grommetted connector connected with a mating connector on the vehicle body side.

Shown in FIGS. 15 and 16 is another example of conventional connector used for interconnecting wire harnesses at automotive door portions. A connector d attached to the end of a door side wire harness k as shown in FIG. 15 is coupled with a vehicle body side connector e to connect the wire hareness k with that on the vehicle body side.

The connector d includes a resilient locking arm f formed with a locking projection f1 which serves to lock together the connector d and its mating connector. Inside the space under the locking arm f is arranged a lock-up detector h for confirming whether or not the locking projection f1 completely engages an associated engagement portion g on the mating connector. The lock-up detector h is forwardly movable on completion of the locking by the resilient locking arm f.

The connector d is covered with a waterproof protecting grommet j from its rear side. Consequently, it is required, on completion of the coupling of the connector d with the vehicle body side connector e, that the lock-up detector h be operated from outside the grommet j. As a result, it cannot be directly ascertained by eyes whether or not the lock-up detector h is completely operated.

SUMMARY OF THE INVENTION

The present invention has been accomplished to overcome the above drawbacks. It is, therefore, an object of the present invention to provide a connector for use in vehicles whose fixation to a panel is ascertainable from outside prior to its coupling with a mating connector for interconnecting the respective wire harnesses on the door side and the vehicle body side and which provides an improved reliability.

It is another object of the present invention to provide a connector for use in vehicles that enables easy confirmation of the position of the operated lock-up detector from outside the grommet covering the connector.

In order to attain the objects, according to an aspect of the present invention, there is provided a connector for use in vehicles which comprises: a body; a resilient locking arm provided on the body by way of a base portion and extending in a fitting direction with a panel, the locking arm having at its free end a locking projection engageable, for locking the connector to the panel, in a connection hole in the panel through which the connector is coupled with a mating connector; a displacement space formed between the locking arm and the body into which the locking arm is resiliently displaced; a lock-up detector longitudinally movably provided in a preliminarily engaged state in the displacement space prior to the fitting of the connector to the panel with a length thereof protruded more than the locking projection of the locking arm; and means provided on each of the locking arm and the lock-up detector which are engageable with each other to put the lock-up detector in the preliminarily engaged state in the displacement space and which are disengaged on completion of the locking of the connector to the panel so that the lock-up detector is further insertable into the displacement space by a push from the side of the panel opposite the connector.

When the connector with the lock-up detector preliminarily engaged in the displacement space is inserted and locked up in the connection hole by the resilient locking arm, the locking arm and the lock-up detector are disengaged from each other, rendering the lock-up detector further insertable to a predetermined position from the opposite side of the panel to the locking arm.

According to another aspect of the present invention, there is provided a connector for use in vehicles which comprises: a body; a resilient locking arm provided on the body and engageable with a mating connector to lock the connectors together; a grommet covering the body and having a sealing hole formed therein; a lock-up detector fitted to the body such that it may be moved with respect to the body when the connectors are completely locked together; and an operating rod fixed to the lock-up detector and extended outside the grommet through the sealing hole in the grommet.

In operation, the lock-up detector is pushed by way of the operating rod, and the locked coupling between the connector and the mating connector is confirmed by the length of the operating rod projecting outside through the sealing hole.

DETAILED DESCRIPTION OF THE PREFERRED EMBODIMENTS

Embodiments of this invention will now be described with reference to the attached drawings.

Figure 1:
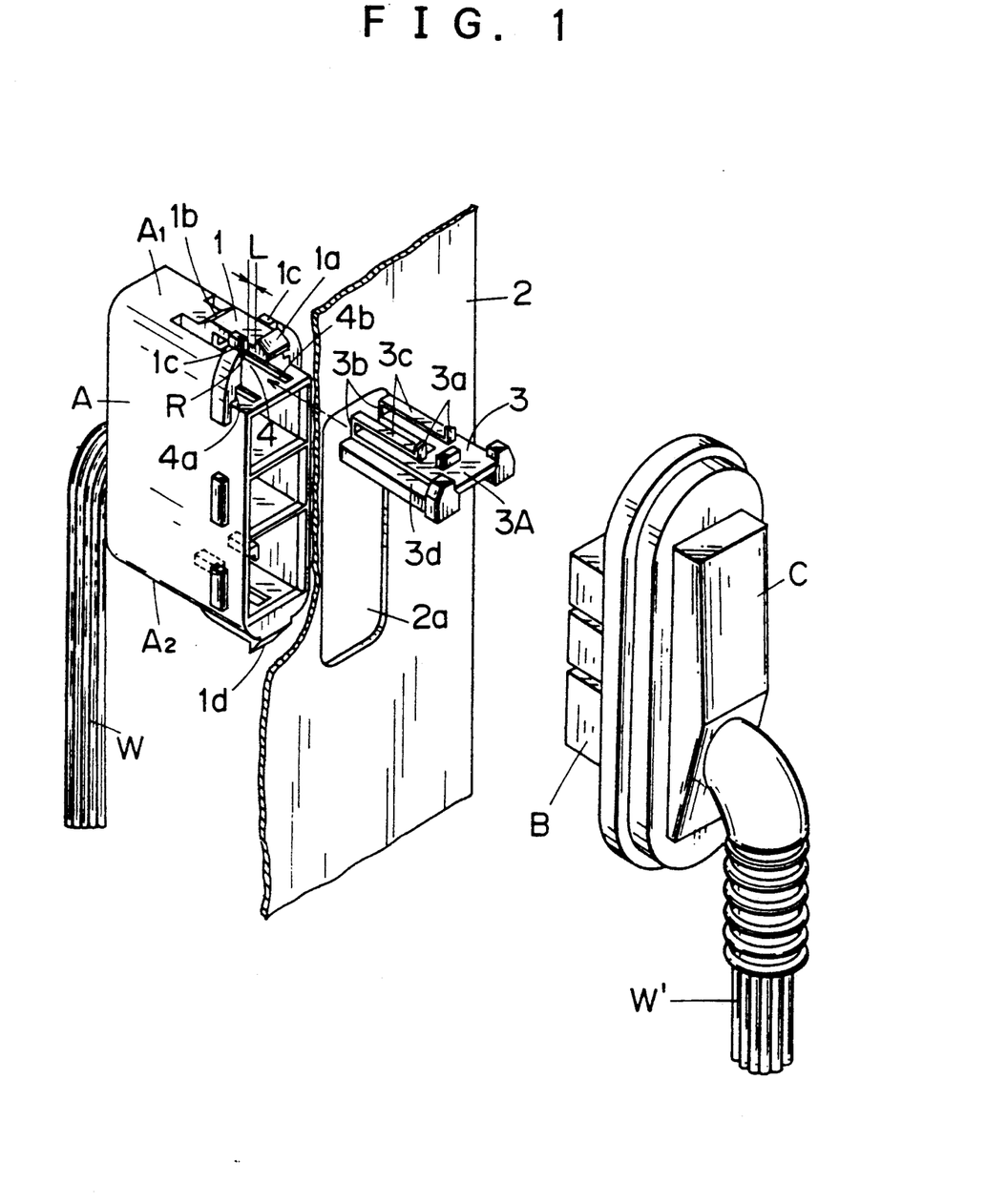
FIG. 1 is an exploded perspective view of a connector according to one embodiment of this invention.

Referring to FIG. 1, denoted A is a connector formed of synthetic resin, which is attached to the connection end of a wire harness W on the body side of a vehicle. Denoted B is a connector attached to the connection end of a door side wire harness W' for coupling with the connector A. The connector B is covered with a grommet C as in the prior art.

As shown in FIG. 1, the connector A has on one outer surface A1 a resilient locking arm 1 in a cantilever form which extends upwardly at a rear base portion 1b and then forwardly. The front end of the locking arm 1 is provided on its upper surface with a locking projection 1a.

Figure 3:
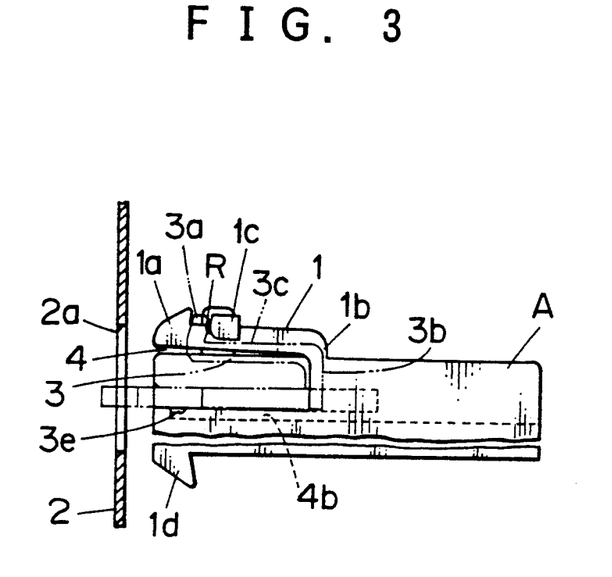
FIG. 3 is a partially broken sectional view showing the connector with the lock-up detector mounted in a preliminarily engaged state therein, which is about to be inserted in a connection hole formed in a panel of a vehicle.

Opposingly disposed on the left and right sides of the locking arm 1 at a position rearwardly spaced from the locking projection 1a by a distance L are engagement projections 1c each having a curved underside R on its front side (FIG. 3). A latch 1d is provided on the outer surface A2 opposite the outer surface A1 of the connector A.

Designated 2 is a panel on the vehicle body side to which the connector A is fixed and 2a a connection hole formed in the panel 2.

Denoted 3 is a synthetic resin-made lock-up detector which includes a substrate plate 3A and two resilient arms 3c in a cantilever form provided at the rear end of the substrate plate by way of rising walls 3b and extending forwardly. The resilient arms 3c are each provided at their front ends with operating projections 3a. The substrate plate 3A further includes on its lateral sides engagement flanges 3d and on its underside guide lugs 3e (FIG. 3).

The above engagement flanges 3d are inserted into support grooves 4a formed on the left and right sides of a displacement space 4 which is provided between the locking arm 1 and the outer surface A1 of the connector A for allowing the resilient displacement of the locking arm 1 therein. The guide lugs 3e are inserted into guide grooves 4b formed on the bottom of the displacement space 4.

Figure 2:
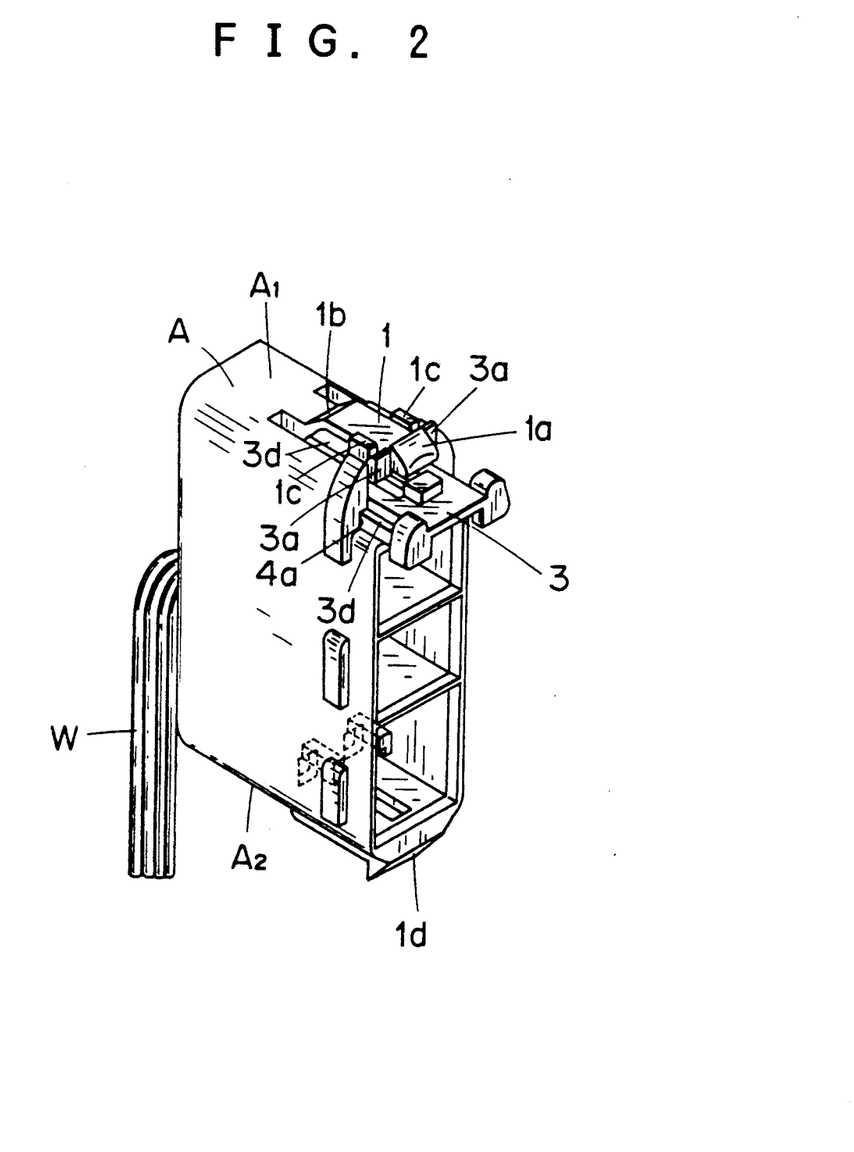
FIG. 2 is a perspective view showing a lock-up detector mounted in a preliminarily engaged state in the connector.

The lock-up detector 3 inserted into the displacement space 4 is prevented from being further inserted when the operating projections 3a come into contact with the engagement projections 1c, putting the lock-up detector 3 in a preliminarily engaged state in the displacement space 4 (FIGS. 2 and 3).

Figure 5:
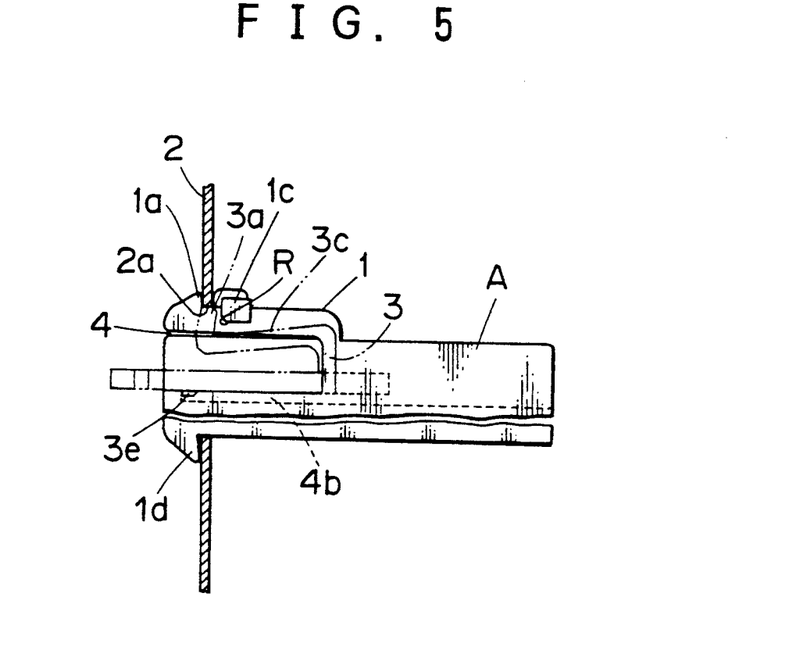
FIG. 5 is a partially broken sectional view showing the state where the connector is engaged in the connection hole and an operating projection of the lock-up detector is pressed down and restrained from returning to its position by the inner edge of the connection hole.

The connector A with the lock-up detector 3 in the preliminarily engaged state on the outer surface A1 is inserted into a connection hole 2a of the panel 2 until the locking projection 1a passes beyond the circumferential inner edge of the connection hole 2a, at which the locking arm 1 resiliently returns to its original position. Concurrently, the operating projections 3a of the lock-up detector 3 come into contact with the inner edge of the hole 2a to be depressed. Consequently, the operating projections 3a of the lock-up detector 3 become disengageable from the engagement projections 1c (FIG. 5).

In the above construction, to fit the connector A to the panel 2, the locking projection 1a of the locking arm 1 joined to the outer surface A1 and the latch 1d on the outer surface A2 opposite the surface A1 are engaged with shoulder portions of the connection hole 2a on the side opposite to the connector A.

Figure 4:
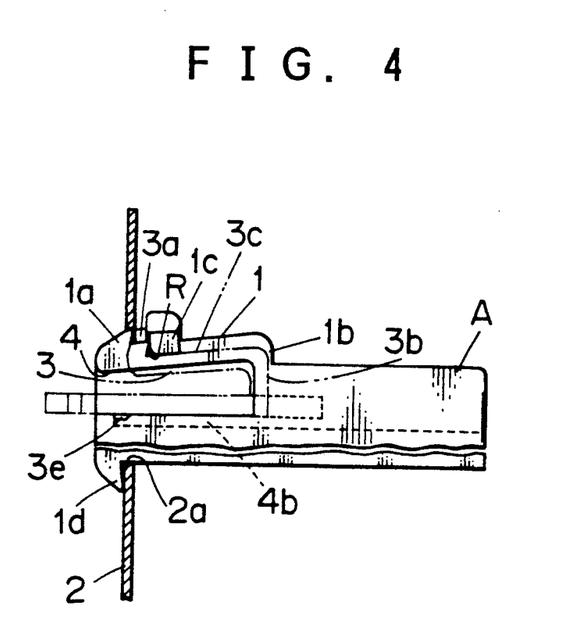
FIG. 4 is a partially broken sectional view showing the connector almost engaged in the connection hole of the panel.

As the connector A is inserted into the connection hole 2a of the panel 2, the locking projection 1a at the front end of the locking arm 1 gets into contact with the circumferential inner edge of the connection hole 2a, causing the locking arm 1 and engagement projections 1c thereon to be resiliently displaced downwardly, the latter in turn downwardly displacing the resilient arms 3c of the lock-up detector 3.

At this stage, the operating projections 3a of the lock-up detector 3 are still in engagement with the engagement projections 1c provided on both sides of the locking arm 1, thereby preventing the lock-up detector 3 from being further advanced into the displacement space 4.

On further insertion of the connector A into the connection hole 2a of the panel 2, the locking projection 1a passes through the panel 2 and is released from the contact with the inner edge of the connection hole 2a, whereby the locking arm 1 resiliently returns to its normal position and engages the shoulder portions of the connection hole 2a on the side opposite to the connector A.

Concurrently with the above, the operating projections 3a of the resilient arms 3c, which are located next to the locking projection 1a of the locking arm 1, come into contact with the inner edge of the connection hole 2a, thereby restraining the resilient arms 3c from resiliently returning to its original position (FIG. 5). The stepping of the inner edge of the connection hole 2a on the operating projections 3a is facilitated by the engagement projections 1c provided on the locking arm 1, the engagement projections 1c pushing down the resilient arms 3c.

Figure 6:
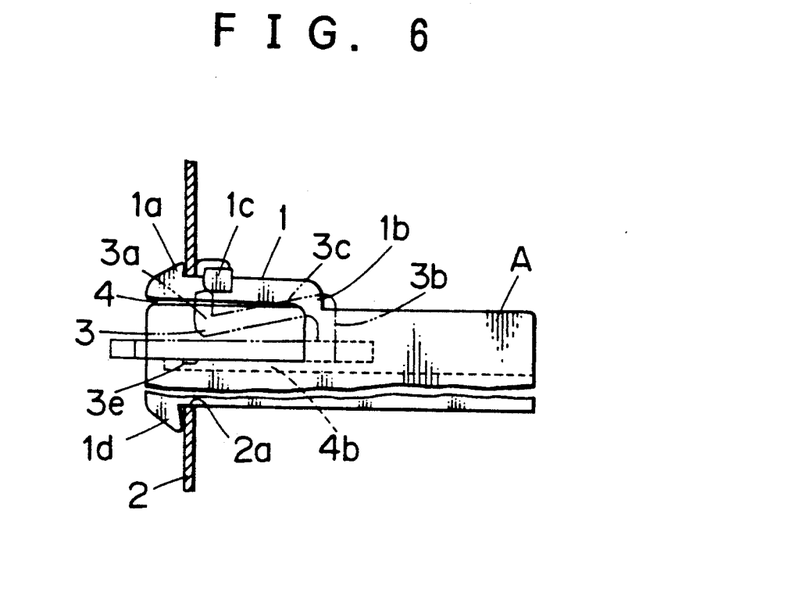
FIG. 6 is a partially broken sectional view showing the state where the operating projection of the lock-up detector is about to be disengaged from an engagement projection on the locking arm.

When the lock-up detector 3 is pushed at this stage from the front side of the panel 2, the operating projections 3a slide downwardly along the curved undersides R of the engagement projections 1c so as to become disengaged from the engagement projections 1c, making it possible for the lock-up detector 3 to be further inserted (FIG. 6).

Figure 7:
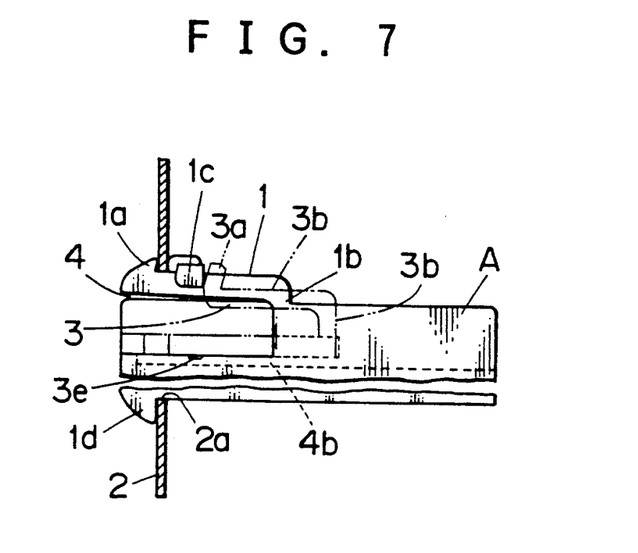
FIG. 7 is a partially broken sectional view showing the panel and the connector engaged with each other.

If the lock-up detector 3 is completely inserted in the displacement space 4, the operating projections 3a of the detector 3 are released from the pressing force by the engagement projections 1c and resiliently restored to their normal position to engage the engagement projections 1c from the opposite side (FIG. 7). As a result, the lock-up detector 3 is prevented from coming off and, at the same time, enables confirmation of the fitting of the connector A in the connection hole 2a of the panel 2.

Figure 8:
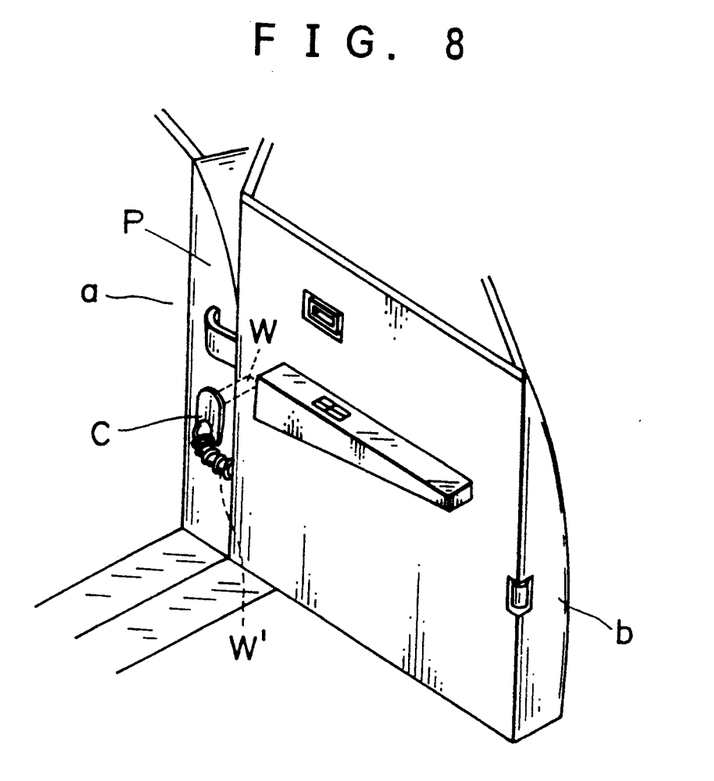
FIG. 8 is a perspective view showing a wire harness fitted at the area between the door and the body of a vehicle.

Thereafter, to put into use, to the connector A attached to the end of the wire harness W on the vehicle body side is coupled the mating connector B attached to the end of the wire harness W' on the door side.

As mentioned above, the lock-up detector in a preliminarily engaged state cannot be inserted to a predetermined position in the connector until after completion of the engagement of the locking arm in the connection hole of a panel to lock the connector to the panel, the fitting of the connector to the panel is confirmed from outside.

As a result, the connection between the wire harnesses on the body and door sides of a vehicle is facilitatedly detected, while at the same time their connection is secured even under external forces such as vibrations, thereby enhancing the reliability of the product.

Figure 11:
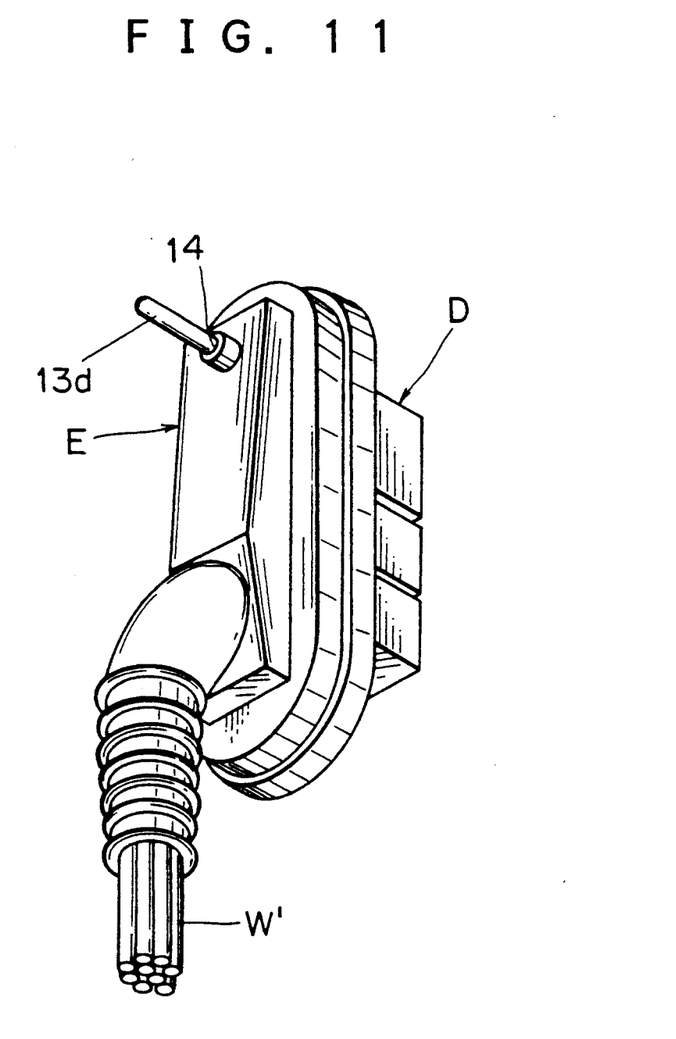
FIG. 11 is a perspective view of a grommetted connector according to one embodiment of this invention.

Referring now to FIG. 11, denoted D is a connector attached to the connection end of a wire harness W' on the door side of a vehicle, which connector is covered with a grommet E of soft rubber.

Figure 13:
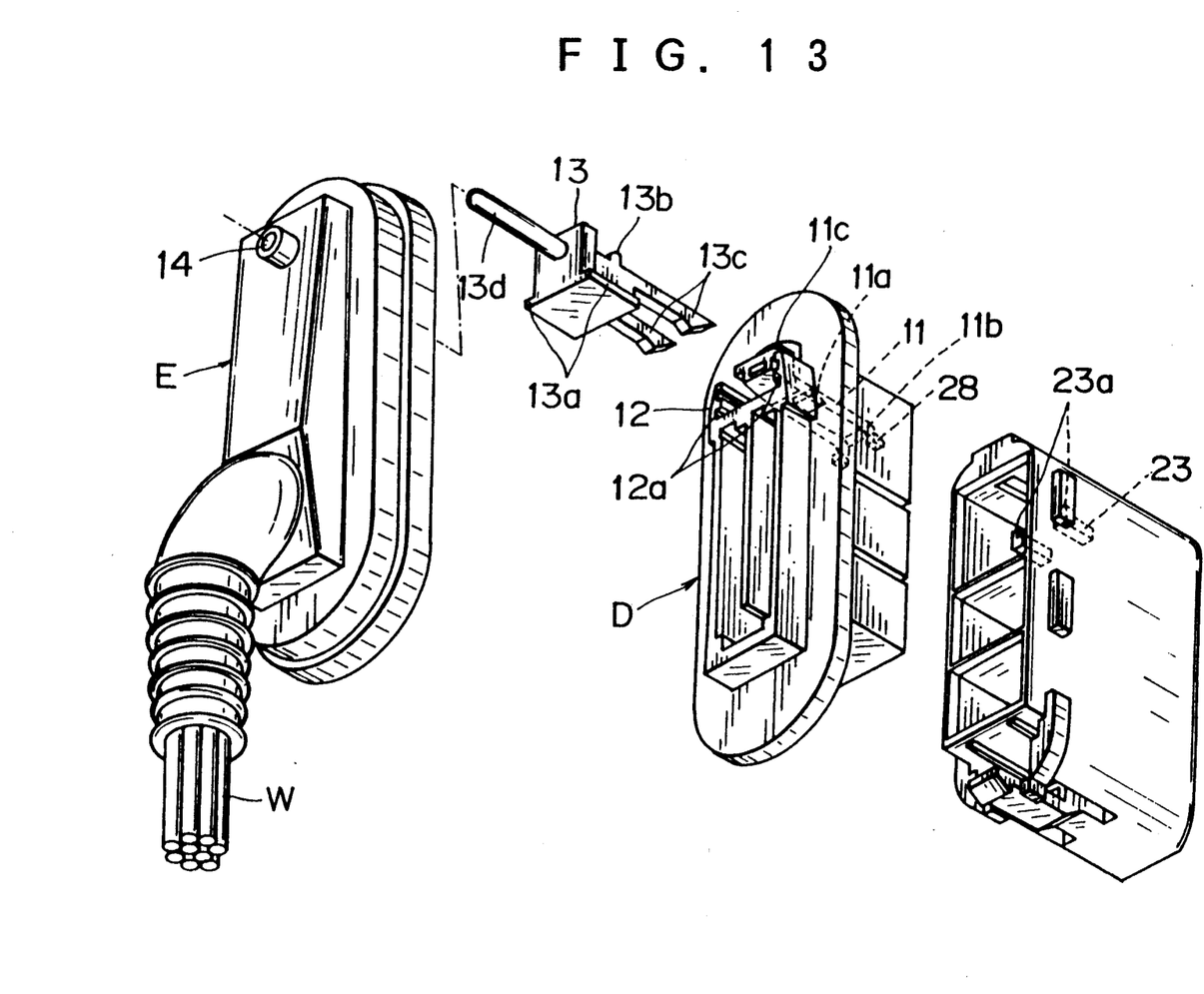
FIG. 13 is an exploded perspective view of the grommetted connector.

As shown in FIG. 13, the connector D includes a body 12 and a resilient locking arm 11 provided in a cantilever form on one external surface of the body, which locking arm 11 extends upwardly at a front base portion 11b and then rearwardly. The locking arm 11 is formed with a locking projection 11a and at its rear end with an operating bulged portion 11c.

Figure 14:
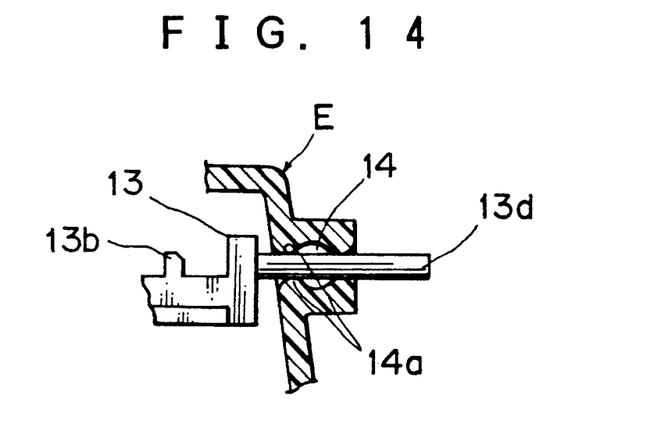
FIG. 14 is an enlarged sectional view of an essential portion of FIG. 11.

A lock-up detector 13 is longitudinally movably disposed in the space formed between the locking arm 11 and the outer surface of the body. The lock-up detector 13 includes at its lower portion laterally extending engagement flanges 3a, at the upper portion an abutment projection 13b against the locking arm 11, and at a point intermediate its height forwardly extending resilient checking pieces 13c. The lock-up detector 13 further includes a rearwardly extending operating rod 13d. The lock-up detector 13 is received in the space under the locking arm 11 with its engagement flanges 13a engaged in guiding grooves 12a formed in the body 12, while covered by the grommet E with the operating rod 13d extended through a sealing hole 14 formed in the grommet E. The operating rod 13d is sealingly held in the sealing hole 14 by ring-shaped ribs 14a formed inside the hole 14 (FIG. 14).

While the connector D is not assembled with a mating connector, the resilient checking pieces 13c of the lock-up detector 13 abut against stopper projections 28 formed on the body 12 so as to limit further advancement of the lock-up detector 13. However, when coupled with a mating connector, driving projections 23a of disengagement members 23 provided on the mating connector cause the checking pieces 13c to be disengaged from the stopper projections 28, making it possible for the lock-up detector 13 to be advanced by a push at the operating rod 13d. In this instance, however, if the connectors are not completely locked, the locking arm 11 remains downwardly displaced, the locking projection 11a thereof having still not reached the associated engagement portion in the mating connector. The result is that the abutment projection 13b of the lock-up detector 13 abuts against the bulged portion 11c at the rear end of the locking arm 11 to prevent insertion of the detector 13. The details of the construction of the lock-up detector 13 are shown in U.S. Pat. No. 4,950,179 listing the same assignee as the present invention.

Figure 12:
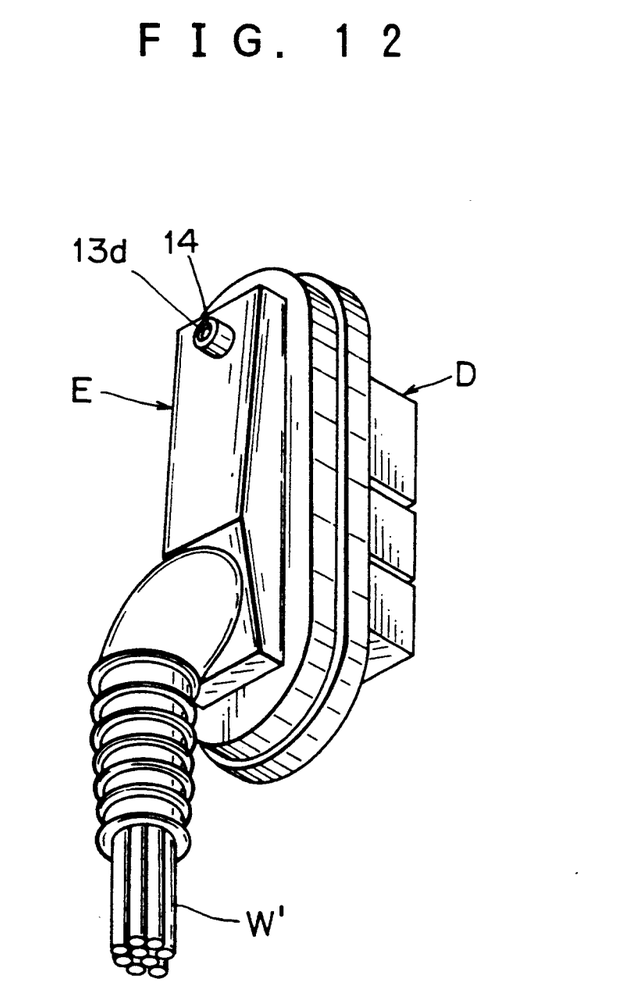
FIG. 12 is a perspective view showing the grommetted connector in a locked state.

When the connectors are completely locked together by the locking arm 11, the lock-up detector 13 is advanced forwardly under the locking arm 11, causing the operating rod 13d of the detector 13 to be almost buried in the sealing hole 14 of the grommet E. Thus, the locked coupling is confirmed.

As mentioned above, the connector with a resilient locking arm engageable with a mating connector is covered with a grommet and includes a lock-up detector having an operating rod extended outside through a sealing hole formed in the grommet. Owing to such construction, the completely locked coupling of the connectors may be confirmed from outside the grommet by means of the operating rod of the lock-up detector which is hermetically contacted in the sealing hole so as to protect the waterproof nature of the grommet.

What is claimed is:

1. A connector for use in vehicles comprising:
   a body;
   a resilient locking arm provided on the body by way of a base portion and extending in a fitting direction with a panel, the locking arm having at its free end a locking projection engageable, for locking the connector to the panel, in a connection hole in the panel through which the connector is coupled with a mating connector;
   a displacement space formed between the locking arm and the body into which the locking arm is resiliently displaced;
   a lock-up detector longitudinally movably provided in a preliminarily engaged state in the displacement space prior to the fitting of the connector to the panel with a length thereof protruded more than the locking projection of the locking arm; and
   means provided on each of the locking arm and the lock-up detector which are engageable with each other to put the lock-up detector in the preliminarily engaged state in the displacement space and which are disengaged on completion of the locking of the connector to the panel so that the lock-up detector is further insertable into the displacement space by a push from the side of the panel through which the locking projection of the locking arm protrudes.

2. A connector as claimed in claim 1, wherein the means provided on the locking arm comprises two engagement projections opposingly provided on the lateral sides of the locking arm at a distance from the locking projection, and the associated means on the lock-up detector comprises two resilient arms provided on the lock-up detector by way of base portions and extending in an opposite direction to the connector, the resilient arms each having at their free ends upwardly directed operating projections engageable with the engagement projections on the locking arm.

3. A connector for use in vehicles comprising:

a body;

a resilient locking arm provided on the body and engageable with a mating connector to lock the connectors together;

a grommet covering the body and having a sealing hole formed therein;

a lock-up detector fitted to the body such that it may be moved with respect to the body when the connectors are completely locked together; and an operating rod fixed to the lock-up detector and extended outside the grommet through the sealing hole in the grommet.

* * * * *